United States Patent [19]

Ragsdale

[11] Patent Number: 4,953,269
[45] Date of Patent: Sep. 4, 1990

[54] SWIMMING POOL ANCHOR AND REMOVAL TOOL

[75] Inventor: Kelly Ragsdale, Salt Lake City, Utah

[73] Assignee: Cover-Pools, Inc. A Utah Corporation, Salt Lake City, Utah

[21] Appl. No.: 377,235

[22] Filed: Jul. 7, 1989

[51] Int. Cl.$^5$ .................. F16B 19/00; B25B 13/16
[52] U.S. Cl. .................... 24/704.1; 24/625; 411/508; 81/176.15
[58] Field of Search ............... 24/704.1, 704.2, 704.5, 24/704.6, 590, 297; 411/508, 553; 81/176.1, 176.15, 460, 461

[56] References Cited

U.S. PATENT DOCUMENTS

| | | | |
|---|---|---|---|
| 1,414,838 | 5/1922 | Street | 24/625 |
| 2,698,557 | 1/1955 | Harper | 411/508 |
| 2,781,683 | 2/1957 | Weeks | 81/176.15 |
| 3,908,235 | 9/1975 | Telliard et al. | 411/508 |
| 4,569,259 | 2/1986 | Rubin et al. | 81/176.15 |

FOREIGN PATENT DOCUMENTS 1021215 3/1966 United Kingdom ............... 24/704.1

*Primary Examiner*—Victor N. Sakran
*Attorney, Agent, or Firm*—Trask, Britt & Rossa

[57] ABSTRACT

A fastener and removal tool adapted for manually securing and thereafter detaching two separate members in a preselected spatial relationship is disclosed. The fastener includes an elongate shaft, an abutment plate mounted on a first shaft end, and a collapsible head mounted on an opposing shaft end. The removal tool includes a plurality of elongate shafts positioned to be driven along the exterior surface of the fastener to apply a compression force along that shaft, thereby effecting a collapse of the shaft end sufficient to permit the retraction of the fastener from its engagement with the connected members.

19 Claims, 4 Drawing Sheets

SWIMMING POOL ANCHOR AND REMOVAL TOOL

BACKGROUND OF THE INVENTION

1. Field:

This invention relates to fasteners and more particularly, to fasteners adapted for securing two members together in a preselected spatial orientation.

2. Statement of the Art:

Various fastener constructions have been suggested in the art for use in connecting one article to another. One particular environment wherein fasteners have been extensively used is in the area of swimming pool covers. For many years, swimming pool owners, anxious to protect the water in their swimming pools from contamination from blowing dirt and leaves, and furthermore to render such pools safer, have utilized fabric covers positioned over the pools. To secure the cover in place, various means have been adapted. One of the more popular methods involves the drilling of a plurality of upright holes in the pool deck about the perimeter of the pool. The cover, fitted with a plurality of grommets, is positioned about the pool perimeter whereby each grommet registers with a respective deck-defined hole. An elongate fastener is individually inserted through a respective grommet and into a corresponding hole to form a securement of the cover with the deck. This fastener is typically one fabricated of a resilient plastic material and is constructed to initially collapse upon being inserted through the grommet and deck hole. Upon being inserted a preselected distance, the fastener expands to abut the sidewalls of the hole to produce a connection engagement.

Owing to the necessity of repeatedly removing the cover to use the pool, the fasteners must be frequently retracted from their retaining holes to free the cover and thereby permit its removal. In the past, a tool having the general configuration of a conventional dandelion puller has been used to remove the fasteners. Such pullers typically include a pair of jaws which are inserted beneath a laterally extending flange or lip of the fastener. The puller is then used like lever to pry the fastener from its engagement with the deck hole. The use of such pullers often results in the destruction of individual fasteners due to the particular forces being applied thereto by the puller tool.

There continues to be a need for a fastener and tool arrangement which provides a means of securing a pool cover to a deck which is easily removed while minimizing the chances that such a removal will damage the fastener.

SUMMARY OF THE INVENTION

The invention discloses a removal tool and a fastener means adapted for detachably securing together in a predetermined spatial relationship a first member, defining an aperture therein, and a second member defining a fastener receiving aperture.

The fastener means is configured to be inserted through the first member aperture and thereafter be secured within the second member aperture. The fastener means is constructed of a resilient material and adapted to be collapsible, permitting the fastener to be inserted through the aforesaid apertures in a collapsed condition and, upon reaching a preselected position within the second member, expand to abut the sidewalls of the second member aperture in a connection-producing engagement. In some embodiments, the fastener includes an abutment plate constructed to limit the length of the fastener means' penetration into the first and second member apertures.

The removal tool includes a handle having a plurality of elongate members or shafts mounted thereon to extend outwardly therefrom. The elongate members are adapted to be inserted along the fastener means, thereby effecting a biasing action on that fastener means, causing compressive forces to be applied to the fastener means and thereby causing a spatial collapse of the fastener means, of sufficient magnitude that the fastener means may be retracted from both the first and second member apertures. The biasing action against the fastener means is also of sufficient magnitude, in association with the resilient reaction of the fastener means, to form a pressure-fit union of the elongate shafts with the fastener means whereby the user may displace the handle of the tool and effect a corresponding retraction displacement of the fastener means from the first and second members. Upon its retraction of the fastener means from the apertures, the union of the first and second members is disengaged.

In some embodiments, the fastener means may include a guide means configured for directing the elongate members along its exterior surface. In preferred constructions, this guide means may be a plurality of open channels defined within the exterior surface of the fastener means, or a plurality of guide openings defined within the abutment plate.

DETAILED DESCRIPTION OF THE DRAWINGS

Figure 1:
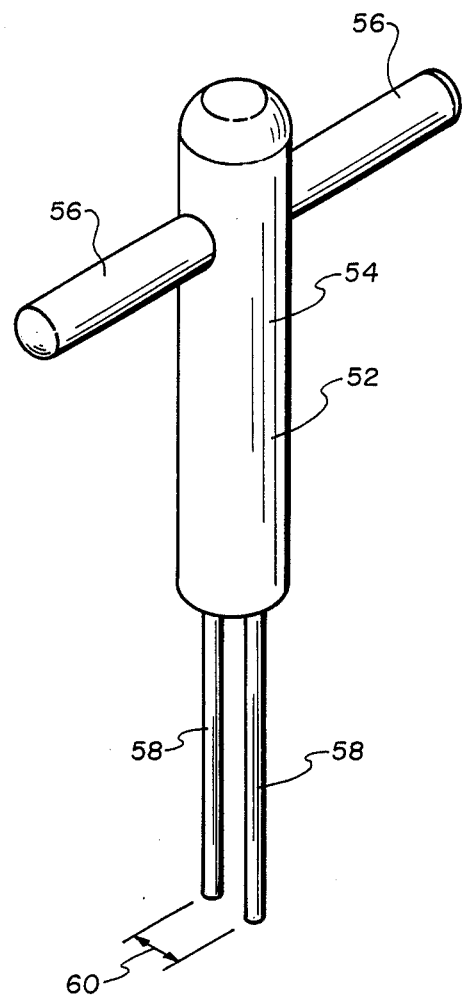
FIG. 1 is a perspective view of a fastener and removal tool of the invention.
Figure 1:
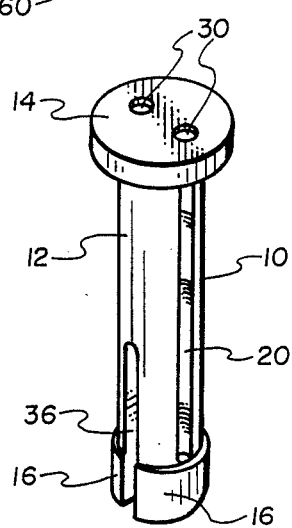

The invention discloses a fastener in association with a tool adapted for removing that fastener from a connection-producing engagement with a first and second member.

Fastener

As shown to advantage in FIGS. 1–7, the fastener 10 of the invention includes a cylindrical elongate support member 12, an abutment plate 14 and a collapsible head 16. Support member 12 is configured as a right cylinder having a diameter 18. A pair of open, linearly-configured channels 20 are defined within the exterior surface of the member 12. The channels 20 are positioned about the member 12 in diametrically opposed locations. The depth 24 of each channel 20 may vary over a length of the channel. In a preferred embodiment, the channel decreases in depth over its length. The depth reaches a maximum proximate the mounting of the abutment plate 14 on member 12. The channel 20 reaches a minimum length, or may even become flush with the cylindrical sidewall of the member 12 proximate the mounting of head 16.

Abutment plate 14 is a disc-shaped member coaxially mounted on member 12 about a common axis 26. Abutment plate 14 is configured to have a diameter 28 which is measurably larger than the diameter 18 of member 12. Defined within abutment plate 14 are two openings or channels 30, which extend through the complete thickness of plate 14. Each channel 30 is positioned to communicate with a respective open channel 20.

Head member 16 is composed of two, generally semi-cylindrical members mounted on member 12 symmetrically about axis 26. The head member 16 defines a diameter 32 which is measurably larger than the diameter 18 of member 12. Due to its larger diameter and its particular configuration, head member 16 defines a flange-like region or lip 34 positioned proximate the mounting of the head member 16 on member 12.

Support member 12 defines a slot 35 therein which passes through the entire thickness of the member 12 and further extends longitudinally along a length of the member 12. The slot 35 is aligned with a void separating the two semi-cylindrical members which constitute head member 16. The slot 35 in conjunction with that void defines a generally planar slot 36 which extends from the end 40 of the fastener 10 to a location approximately one-half of the length of the fastener.

Figure 3:
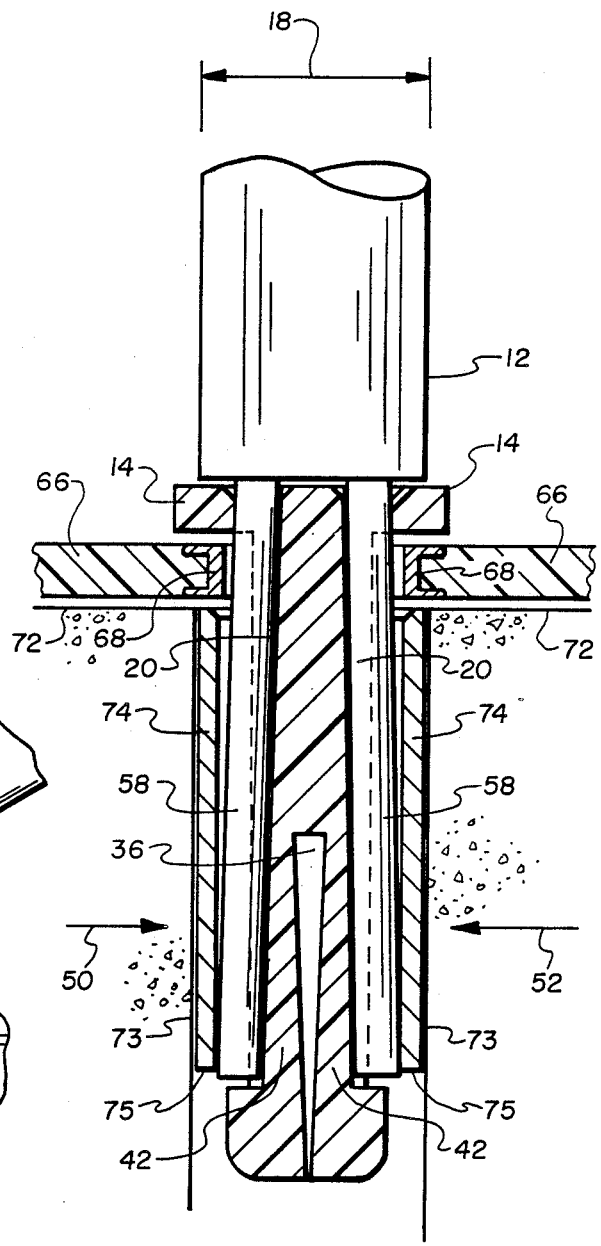
FIG. 3 is a side elevational view of a removal tool engaging a fastener within a recess well defining sleeve.
Figure 4:
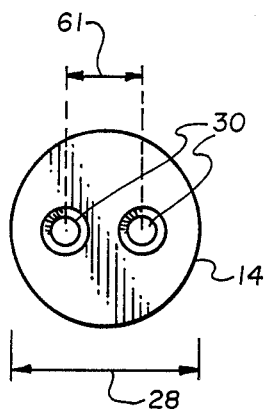
FIG. 4 is a top plan view of an abutment plate of the fastener of the invention.
Figure 7:
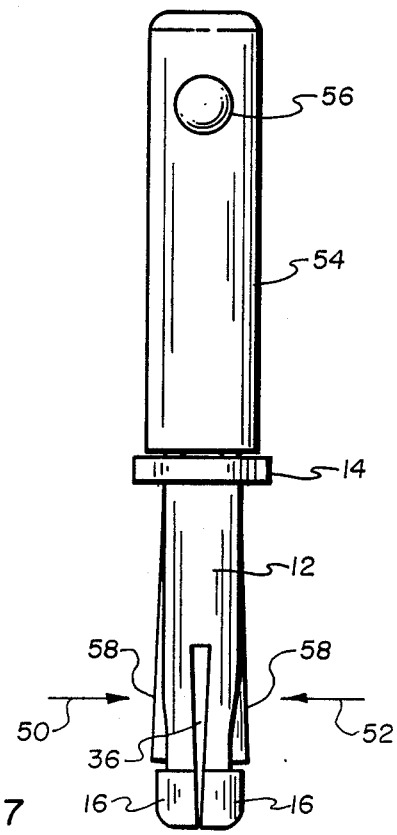
FIG. 7 is a side elevational view of a removal tool engaging a fastener.

The head member 16, support member 12, and abutment plate 14 may be formed as an integral unit. The fastener is fabricated of a resilient material. Due to that fabrication the pair of legs 42 defined by the slot 36 are displaceable toward each other as shown in FIGS. 3 and 7 upon the imposition of forces on the exterior surface of fastener 10 in the directions indicate by arrows 50 and 52.

Figure 5:
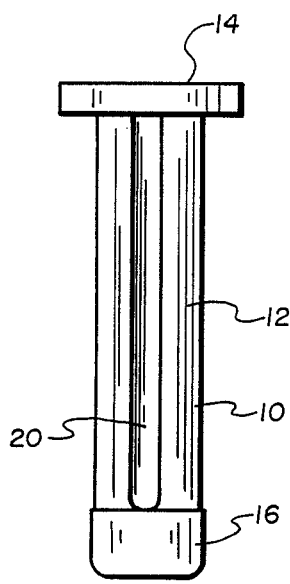
FIG. 5 is a side elevational view of the fastener of the invention.
Figure 6:
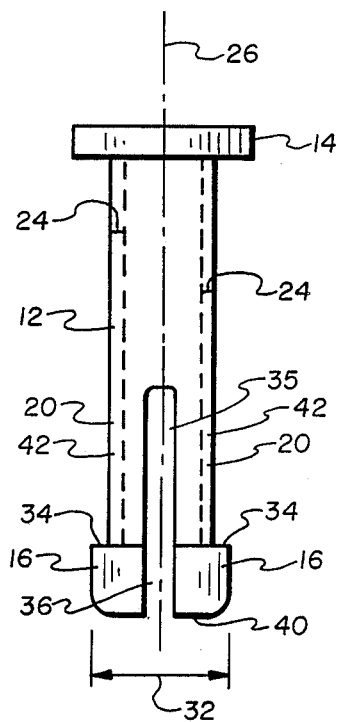
FIG. 6 is a side elevational view of the fastener of FIG. 5 by ninety (90) degrees.

Upon the release of those force applications, the resilience of the fastener causes those legs 42 to return to the condition shown in FIG. 5.

In preferred constructions, the slot 36 defines a substantially planar configuration. This plane is oriented orthogonally to the plane containing the pair of opposing channels 20.

Removal Tool

Figure 2:
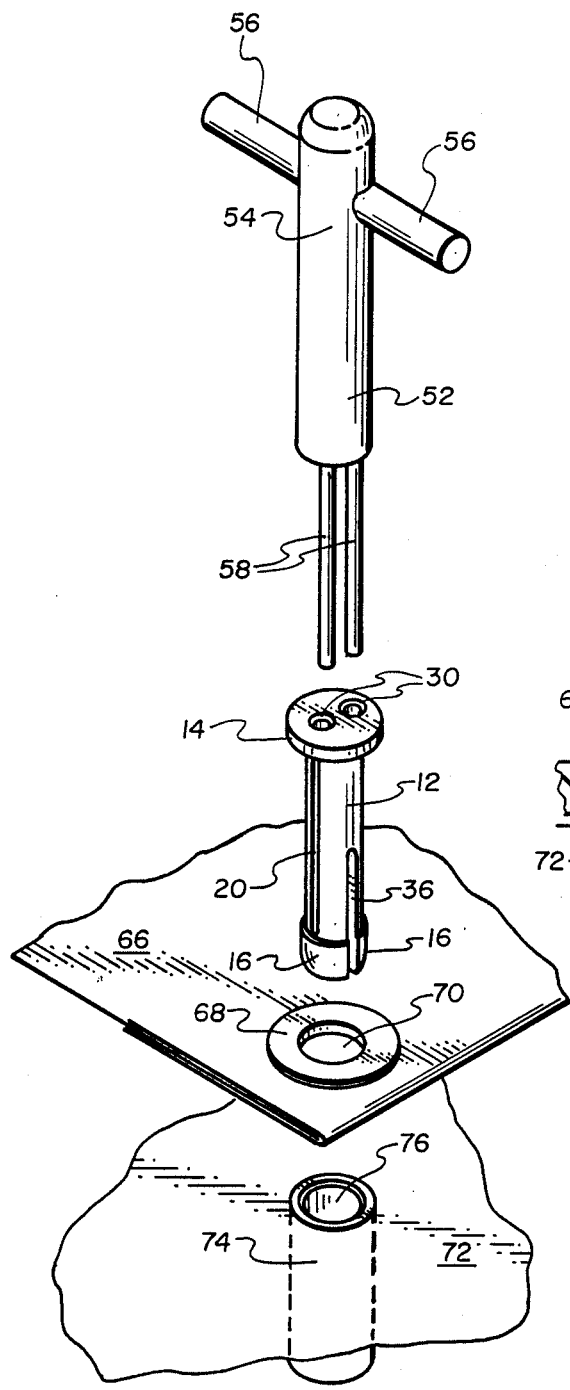
FIG. 2 is an exploded view of an in situ installation of the invention depicting a removal tool, a fastener and an aperture defining swimming pool cover in association with a recess well defining sleeve.

As shown more particularly in FIGS. 1-3, the removal tool 52 includes a handle 54, a pair of laterally extending members 56 mounted on the handle 54 and a pair of elongate shafts 58 mounted on an end of handle 54 to extend outwardly therefrom.

The handle 54 is an elongate cylindrically shaped member. A pair of elongate cylindrical shafts 56 are mounted on handle 54 to extend outward and form a hand graspable means of manipulating the handle. In a preferred embodiment, shafts 56 are formed by a unitary shaft journaled through the handle 54.

Each of the shafts 58 are positioned to extend generally parallel to one another. The shafts 58 are spacedly positioned apart from one another a distance 60 which distance corresponds generally to the spacing 61 of the openings in the abutment plate 14. The shafts 58 are fabricated from a generally rigid material having some resiliency. The shafts 58 are dimensioned to be substantially the length of the combined length of the abutment plate 14 and member 12. As shown in FIG. 7, upon the full insertion of those shafts 58 into the openings 30, the handle 54 is brought into abutment against the abutment plate 14 and the ends of the shafts 58 are positioned adjacent lip 34.

As shown in FIGS. 2 and 3, the fastener 10 is adapted to secure a swimming pool cover 66 having an aperture 70 defining grommet 68 mounted therein to a concrete pool deck 72 which defines an upright hole 73 therein. Positioned within hole 73 is a hollow, open-ended cylindrical sleeve 74 which defines a hollow channel 76 which extends along the entire length thereof.

To install the fastener 10, initially the sheet-like cover 66 is laid over the pool surface aligning the aperture-defining grommets such that each aperture 70 is positioned over a channel 76 defined by a respective sleeve 74 which has been installed in a hole drilled into the deck 72.

Figure 8:
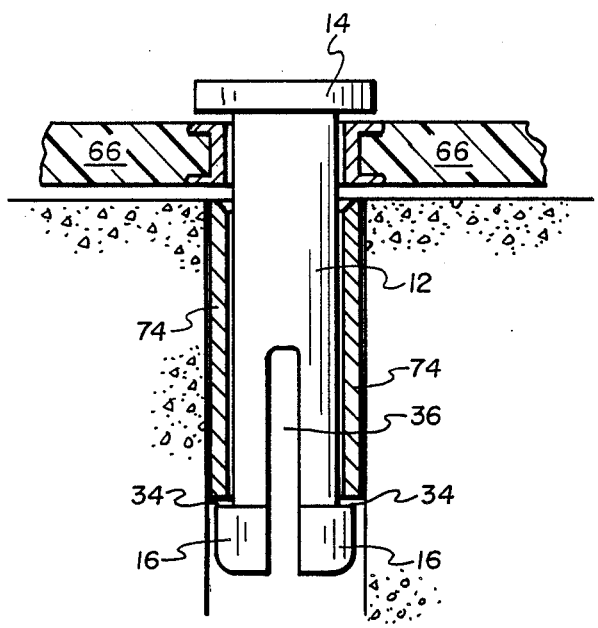
FIG. 8 is a side view of a fastener of the invention positioned within a sleeve-retaining deck hole.

The fastener head 16 is then forcedly inserted through the aperture 70 and into channel 76. The diameter of the circular aperture 70 and the diameter of the cylindrical channel 76 are both dimensionally smaller than the total diameter of the uncompressed head 16. As a result of the downwardly acting force on the fastener 10, during installation and the resiliency of the material from which the fastener is fabricated, the legs 42 of the fastener are driven toward one another, thereby decreasing the diameter of slot 36 over the head 16 region thereof. In this operation, the compressed diameter of head 16 becomes dimensionally smaller than the diameters of aperture 70 and channel 76. As shown, the diameter of the shaft 12 is less than the diameters of aperture 70 and channel 76. Therefore, with the head 16 in a compressed condition, the fastener may be urged through aperture 70 and channel 76. The length of sleeve 74 is preferably dimensioned whereby upon the complete insertion of the fastener head 16 through the channel 76, the head 16 may expand, due to the resiliency of its manufacturing material, whereby the flanges on lips 34 of each of the head is urged outward into engagement against the lower end 75 of the sleeve 74. (See FIG. 8.) Alternatively, the heads 16 may be urged outward to abut against the interior channel-defining sidewall of the sleeve 74. In one construction, the head forms a lip-like union against the sleeve, in the latter construction, the abutment of the head 16 against the sleeve 74 forms a pressure-fit connection with the sleeve 74.

The diameter of the abutment plate 14 is dimensionally larger than the diameter of the aperture 70. The shaft 12 is dimensioned to have a length which causes the abutment plate 14 to be positioned in abutment against the grommet 68 as the head 16 engages the end of the sleeve 74. The abutment plate 14 therefore retains the cover 66, due to the abutment of plate 14 against grommet 68. The cover 66 is held in place and in a preselected spatial relationship with deck 72.

The fastener 10 is removed from its anchoring position in the pool deck 72 by use of tool 52. As illustrated, the user grasps the handle 54, either by its shank or the lateral extending members 56 and aligns the elongate members 58 with the apertures 30 defined in abutment plate 14. Thereafter, the members 58 are inserted through those apertures 30. As each member 58 exits its aperture 30, it is received into a respective shaft channel 20. Upon further insertion of the members 58 along the channels 20, the depth of those channels decrease. The substantially rigid, yet somewhat flexible shafts 58 begin to apply a compressive force on the shaft 12 as they are further urged along the length of shaft 12. As this force application continues with increased insertion, the legs 42 are urged toward each other in a collapsing action, as the slot 36 is spatially decreased proximate its end positioned contiguously to head 16. As shown in FIG. 3, the legs 42 may actually abut against each other at their free ends.

As the legs 42 are collapsed about slot 36, the flanges 34 are disengaged from the ends 75 of sleeve 74, bringing the fastener 10 into the condition shown in FIG. 3. As shown, the fastener 10 is now sufficiently collapsed to permit an upward retraction-type displacement of that fastener 10 which avoids any engagement of the head 16 with the sleeve 74 on the grommet 68.

As shown in FIG. 3, the diameter of shaft 12 is configured such that the shafts 58 may be accommodated in the space between the in situ shaft 12 and the interior channel-defining sidewall of sleeve 74.

Due to the substantial rigidity of the shafts 58 and their mounting on shaft 54, the ends 59 of those shafts 58 exert sufficient pressure on the shaft 12 in the orientation shown in FIG. 3, that a pressure-fit connection or union is formed between the tool 52 and the fastener 10. This connection is of sufficient strength that given a user-induced upward displacement of the tool 52 in the direction indicated by arrow 78, the fastener 10 is similarly displaced, upward and out of the channel 76 and through the aperture 70 and thus disengaged.

Noticeably, the instant method provides a means of disengaging the head flanges 34 from the sleeve ends 75 prior to the application to the fastener of vertically upward directed disengagement forces. In contract, the prior tool shave relied upon the insertion of lever between the abutment plate 14 and the grommet 68, or between the grommet 68 and the sleeve 74 and the initial direct application of an upwardly directed disengagement force without first disengaging any engagement of the fastener with the sleeve which may have been created within the deck hole, i.e. with the lower end of the sleeve 74. Understandably, in the prior method oftentimes the prior counterpart of head 16 was broken off of its support shaft, or the shaft itself was ruptured when the head counterpart remained steadfast.

Reference in this disclosure to details of the specific embodiment is not intended to restrict the scope of the appended claims, which themselves recite those features regarded as essential to the invention.

What is claimed:

1. The combination of fastener and removal tool comprising:
    a resilient, collapsible fastener means for use in detachably securing together a first member, which defines an aperture therethrough, and a second member, having a receiving aperture therein, said fastener means being sized to be inserted through said first member aperture and received within said second member aperture, thereby forming a detachable union of said first and second member; said fastener means including an abutment means mounted thereon, sized to preclude an insertion thereof through said first member aperture; said abutment means defining a plurality of spaced openings therethrough, each said opening being dimensioned to receive slidably a respective said elongate member, each of said openings being configured to direct a respective elongate member into a biased engagement against said fastener means; and
    a removal means for removing said fastener means from its securement positioning through said first member aperture and in said second member aperture, said removal means including a plurality of elongate members sized to be inserted through a said first member aperture and positioned in biased contact against said fastener means to effect a collapse of said fastener means while providing a pressure-fit connection with said fastener means to facilitate a withdrawal of said fastener means upon a withdrawal of said removal means.

2. The combination of claim 1 wherein said fastener means is constructed to be collapsible diametrically.

3. The combination of claim 1 wherein said fastener means is fabricated of a resilient material.

4. The combination of claim 3, wherein said fastener means defines at least one slot therein adapted to be collapsed upon an imposition of a biasing action of said elongate member.

5. The combination of claim 3, wherein said fastener means defines at least one slot therein adapted to be collapsed upon an imposition of a biasing action on said elongate member.

6. The combination of claim 1 wherein said fastener means defines a plurality of channels therein configured to receive and direct said elongate members along a length thereof.

7. The combination of claim 1 wherein said removal means comprises:
    a handle configured to be manually grasped; and
    a plurality of elongate members spacedly mounted on said handle to extend outwardly therefrom.

8. The combination of claim 1 wherein said fastener means is constructed to be collapsible diametrically.

9. The combination of claim 1 wherein said fastener means is fabricated of a resilient material.

10. The combination of claim 1 wherein said fastener means defines a plurality of channels therein configured to receive and direct said elongate members along a length thereof.

11. The combination of claim 1 wherein said removal means comprises:
    a handle configured to be manually grasped; and
    a plurality of elongate members spacedly mounted on said handle to extend outwardly therefrom.

12. The combination of a fastener and a removal tool for use in detachably securing together a first member defining an aperture therethrough and a second member having fastener-receiving aperture therein, said combination comprising:
    a fastener comprising:
        an elongate shaft having a resilient collapsible first end which is diametrically larger than a remainder of said shaft, said shaft being dimensioned to slidably pass through said first member aperture and be received in said fastener receiving aperture;
        an abutment plate mounted on a second end of said shaft, said abutment plate being dimensioned to be larger than said first member aperture, said abutment plate defining a plurality of apertures therethrough; and
    a removal tool comprising:
        a hand graspable handle; and
        a plurality of resilient, elongate rods mounted on a first end of said handle to extend outwardly therefrom, said rods being dimensioned and spacedly positioned to be insertable through said abutment plate apertures;

wherein said rods are biased against said shaft upon an insertion of said rods though said abutment plate apertures, said rods thereby exerting a force against said shaft sufficient to collapse said first end and create a pressure-fit connection between said rods and said elongate shafts of sufficient strength to retain said shaft with said rods during an upward displacement of said handle, thereby providing a means of removing said fastener from said second member defined fastener-receiving aperture.

13. The combination of claim 12 wherein said elongate shaft defines a plurality of longitudinally extending channels within an extension surface thereof, each of said channels being dimensioned to receive and guide a respective rod along a length of said shaft.

14. The combination of claim 13 wherein each of said channels has a depth which decreases over a length of said channel.

15. The combination of claim 12 wherein said shaft first end defines an open-ended slot therein which extends along a second length of said shaft.

16. The combination of claim 12 wherein said shaft slot is oriented substantially orthogonal to a plane containing a pair of channels.

17. The combination of claim 12 wherein said handle includes a laterally extending member adapted to be grasped by a user.

18. The combination of a fastener and a removal tool for use in detachably securing together a first
member defining an aperture therethrough and a second member having a fastener receiving aperture therein, said combination comprising:
a fastener having:
an elongate resilient shaft having a first end and a second end, said first end having a larger diameter than a remainder of said shaft, said first end defining an openended slot therein which extends longitudinally along said shaft a first length, said shaft being collapsible about said lot; said shaft defining a plurality of longitudinally directed channels within an exterior surface thereof, each of said channels having a depth which decreases in depth over a second length of said shaft, said slot being oriented substantially orthogonal to a plane containing said channels, and
an abutment plate mounted on said shaft second end, said plate defining a pair of spaced apertures therethrough;
a removal tool having:
an elongate handle having a lateral extending member mounted thereto, and
a pair of substantially parallelly and spacedly positioned elongate rods mounted in said handle to extend outwardly therefrom, each said rod being dimensioned to pass through one of said abutment plate apertures and be received within one of said shaft defined channels;
wherein, upon an insertion of said rods through said abutment plate apertures, each said rod is received within a respective shaft channel and
biased against said shaft, said pair of rods effecting a compression of said shaft, causing a dimensional collapse of said first end about said slot, said biasing of said rods against said shaft effecting a pressure-fit union with said shaft sufficient to permit a retraction of said fastener from said second member fastener receiving aperture upon an upward displacement of said handle.

19. The combination of fastener and removal tool comprising;
a resilient, collapsible fastener means for use in detachably securing together a first member, which defines an aperture therethrough, and a second member, having a receiving aperture therein, said fastener means being sized to be inserted through said first member aperture and received within said second member aperture, thereby forming a detachable union of said first and second member; said fastener means including an abutment member mounted thereon, dimensioned to be larger than a diameter of said first member aperture; said abutment member defining a plurality of spaced openings therethrough, each opening being configured to permit a passage therethrough of a respective elongate member, said abutment member openings being configured to direct an elongate member passing therethrough against said fastener means to form a biased pressured union therewith; and
a removal means for removing said fastener means from its securement positioning through said first member aperture and in said second member aperture, said removal means including a plurality of elongate members sized to be inserted through a said first member aperture and positioned in biased contact against said fastener means to effect a collapse of said fastener means while providing a pressure-fit connection with said fastener means to facilitate a withdrawal of said fastener means upon a withdrawal of said removal means from said first member aperture, said removal means including:
a handle configured to be manually grasped, and
a plurality of elongate members spacedly mounted on said handle to extend outwardly therefrom.

* * * * *